(12) United States Patent
Sipos

(10) Patent No.: US 10,590,235 B2
(45) Date of Patent: Mar. 17, 2020

(54) PROCESS FOR THE PREPARATION OF A POLYESTER

(71) Applicant: Synvina C.V., Amsterdam (NL)

(72) Inventor: Laszlo Sipos, Amsterdam (NL)

(73) Assignee: Synvina C.V., Amsterdam (NL)

( * ) Notice: Subject to any disclaimer, the term of this patent is extended or adjusted under 35 U.S.C. 154(b) by 73 days.

(21) Appl. No.: 15/759,243

(22) PCT Filed: Sep. 14, 2016

(86) PCT No.: PCT/NL2016/050632
§ 371 (c)(1),
(2) Date: Mar. 12, 2018

(87) PCT Pub. No.: WO2017/048119
PCT Pub. Date: Mar. 23, 2017

(65) Prior Publication Data
US 2018/0258219 A1    Sep. 13, 2018

(30) Foreign Application Priority Data
Sep. 14, 2015 (NL) ...................................... 2015433

(51) Int. Cl.
*C08G 63/16* (2006.01)
*C08G 63/78* (2006.01)
*C08G 63/181* (2006.01)

(52) U.S. Cl.
CPC .......... *C08G 63/16* (2013.01); *C08G 63/181* (2013.01); *C08G 63/78* (2013.01)

(58) Field of Classification Search
CPC ...... C08G 63/85; C08G 63/181; C08G 63/60; C08G 63/668; C08G 63/80; C08G 63/672
See application file for complete search history.

(56) References Cited

U.S. PATENT DOCUMENTS

| 2,551,731 A | 5/1951 | Drewitt et al. |
| 2009/0124763 A1 | 5/2009 | Matsuda et al. |
| 2017/0015781 A1* | 1/2017 | Kolstad ................ C08G 63/181 |

FOREIGN PATENT DOCUMENTS

| KR | 20140003167 A | 1/2014 |
| WO | 2010/077133 A1 | 7/2010 |
| WO | 2013/062408 A1 | 5/2013 |
| WO | 2013/120989 A2 | 8/2013 |
| WO | 2014/204296 A1 | 12/2014 |
| WO | 2015/137806 A1 | 9/2015 |

* cited by examiner

*Primary Examiner* — Robert S Jones
(74) *Attorney, Agent, or Firm* — Hoffmann & Baron, LLP

(57) ABSTRACT

A polyester including ethylene 2,5-furandicarboxylate units is prepared in a process, where in an esterification step a 2,5-furandicarboxylate compound is reacted with ethylene glycol to form an ester composition, including components with 2-hydroxyethyl and 2,5-furandicarboxylate moieties; where in a polycondensation step the ester composition thus obtained is subjected to polycondensation at reduced pressure in the presence of a polycondensation catalyst to obtain a polycondensate; and where during the polycondensation step 2,5-furandicarboxylic acid is added to the ester composition.

19 Claims, No Drawings

PROCESS FOR THE PREPARATION OF A POLYESTER

CROSS-REFERENCE TO RELATED APPLICATIONS

This application is the National Stage of International Application No. PCT/NL2016/050632, filed Sep. 14, 2016, which claims the benefit of Netherlands Application No. NL 2015433, filed Sep. 14, 2015, the contents of which is incorporated by reference herein.

FIELD OF THE INVENTION

The present invention relates to a process for the preparation of a polyester comprising ethylene 2,5-furandicarboxylate units. In particular it relates to a process for the preparation of poly(ethylene-2,5-furandicarboxylate) which has an excellent color.

BACKGROUND OF THE INVENTION

U.S. Pat. No. 2,551,731 describes the preparation of polyesters and polyester-amides by reacting glycols with dicarboxylic acids of which at least one contains a heterocyclic ring, such as 2,5-furandicarboxylic acid (2,5-FDCA). Under melt polymerization conditions, using sodium- and magnesium methoxide as a catalyst, 2,5-FDCA and 2.5 equivalents of ethylene glycol or 2,5-FDCA dimethyl ester and 1.6 equivalents of ethylene glycol were reacted in a esterification step or transesterification step, respectively, at ambient pressure between 160 and 220° C., after which a polycondensation was carried out between 190 and 220° C. under a few mm Hg pressure. The polycondensation process took between about 5 to over 7 hours. The product had a reported melting point of 205-210° C. and readily yielded filaments from the melt.

In US 2009/0124763 polyesters are described, having a 2,5-furandicarboxylate moiety within the polymer backbone and having a degree of polymerization of 185 or more and 600 or less. These polymers are made in a three step process involving the esterification of the 2,5-FDCA or the transesterification of the diester thereof with a diol, and a second step involving polycondensation, followed by solid state polymerization as third step.

The first step is carried out at ambient pressure at a temperature within a range of 150 to 180° C., whereas the polycondensation step is carried out under vacuum at a temperature within a range of 180 to 230° C. The product is then purified by dissolving the same in hexafluoroisopropanol, re-precipitation and drying, followed by the third step, a solid state polymerization at a temperature in the range of from 140 to 180° C. For the preparation of poly(ethylene furandicarboxylate) the first two steps took over 11 hours.

In WO 2013/120989 a continuous process for the preparation of poly(ethylene furandicarboxylate) is described wherein 2,5-FDCA or a diester thereof is mixed with ethylene glycol at elevated temperature to give a paste or a homogeneous solution, the paste or solution is converted to an esterification product of 2,5-FDCA and ethylene glycol, the esterification product is polycondensed under reduced pressure, wherein the polycondensation is performed in two stages. According to an example the dimethyl ester of 2,5-FDCA was reacted with ethylene glycol in a molar ratio of 1:1.7. In this example the stages following the production of the esterified product took 5 hours. The polycondensation product can be subjected, if desired, to a solid stating polymerization.

These patent documents do not refer to any coloration of the resulting polyesters. However, it is known that 2,5-furandicarboxylate-containing polyesters suffer from coloration. They tend to become yellow to brown. Such coloration has for instance been mentioned in P. M. Heertjes et al., Delft Progr. Rep., Series A: 1 (1974) 59-63 and Y. Hachihama et al., Technol. Repts. Osaka Univ. 1958, 8, 475-480.

In WO 2010/077133 a process for preparing furandicarboxylate-containing polyesters is described wherein the diester of 2,5-FDCA is transesterified with a diol, and the ester composition thus obtained is subjected to polycondensation in the presence of different tin catalysts. The polycondensation is conducted for a period of up to 5 hours. The polycondensate may then be subjected to solid state polymerization. In an example the solid state polymerization was conducted for 60 hours. Although the polyester obtained had good transparency properties, the process takes very long. An improvement is described in WO 2013/062408, wherein the dimethyl ester of 2,5-FDCA is transesterified with ethylene glycol, or bis(2-hydroxyethyl)-2,5-furandicarboxylate is used as starting material. The transesterification product or this starting material is then subjected to polycondensation and after a drying/crystallization step the polycondensate is subjected to solid state polymerization. The polycondensation was shown to take three hours. In an example the solid state polymerization takes two days. Although the object of the process of WO2012/062408 was to prepare a polyester with a high molecular weight without suffering from discoloration, no information on the color is provided in the specification.

KR 20140003167 describes a polyester polymer with an allegedly acceptable transparency, which is manufactured by using a biomass-originated 2,5-furandicarboxylate ester compound with ethylene glycol. In comparative examples also 2,5-furandicarboxylic acid has been used. The molar ratio of 2,5-furandicarboxylate ester to ethylene glycol may be from 1:1.1 to 1:4. The ratio of 2,5-furandicarboxylic acid to ethylene glycol varies between 1:1.2 to 1:2. No solid state polymerization is mentioned.

WO 2014/204296 describes polyesters comprising dicarboxylic acid residues and diol residues, wherein the dicarboxylic acid comprises 2,4-furandicarboxylic acid. These polyesters are stated to be surprisingly colorless or slightly yellow. In a comparative experiment the preparation of poly-ethylene-2,5-dicarboxylate is shown, wherein 2,4-durandicarboxylic acid dimethyl ester is reacted with 1,2-ethanediol, synonymous to ethylene glycol, in a molar ratio of 1:2. A number average molecular weight, determined by gel permeation chromatography using HFIP (hexafluoroisopropanol) as solvent of about 19,000 is reported. No information on the end groups or on the color of this polyester has been provided.

The above documents show that the coloration of polyesters that comprise 2,5-furandicarboxylate units is a re-occurring problem. Any measure that would mitigate this problem would be welcomed. Moreover, the solid state polymerization of many known methods takes a very long time. There is therefore a desire to enhance the solid state polymerization rate.

SUMMARY OF THE INVENTION

According to the present invention it has been found that a particular method to conduct the polymerization of a 2,5-furandicarboxylate compound and ethylene glycol has a beneficial effect on the color of the resulting polyester and/or on the rate with at which a polyester is polymerized in a solid state polymerization step. The feature entails that at a specific moment during the polymerization process an amount of 2,5-furandicarboxylic acid is added to the reaction mixture.

Accordingly, the present invention provides a process for the preparation of a polyester comprising ethylene 2,5-furandicarboxylate units, wherein in an esterification step a 2,5-furandicarboxylate compound is reacted with ethylene glycol to form an ester composition, comprising components with 2-hydroxyethyl and 2,5-furandicarboxylate moieties; wherein in a polycondensation step the ester composition thus obtained is subjected to polycondensation at reduced pressure in the presence of a polycondensation catalyst to obtain a polycondensate; and
wherein during the polycondensation step 2,5-furandicarboxylic acid is added to the ester composition.

DETAILED DESCRIPTION OF THE INVENTION

The process according to the present invention may be conducted with a variety of starting materials. As is shown in the above-mentioned patent documents, the furan-dicarboxylate compound that is to be reacted with ethylene glycol may be selected from the acid, the dialkyl ester, the diacyl chloride and combinations thereof. The more suitable starting material is selected from 2,5-furandicarboxylic acid and the dialkyl ester of 2,5-furandicarboxylic acid. The most preferred starting material is the dialkyl ester of 2,5-furandicarboxylic acid. The dialkyl group in such a diester is preferably a lower alkyl group, i.e. an alkyl group with 1 to 4 carbon atoms. Most preferably, the 2,5-furandicarboxylate compound is dimethyl-2,5-furandicarboxylate, diethyl-2,5-furandicarboxylate or a mixture thereof. It has been found that the effect of the addition of 2,5-furandicarboxylic acid is very prominent when diesters such as dimethyl-2,5-furandicarboxylate are used as reactant in the esterification step.

In the esterification step, the reactants, i.e. the 2,5-furandicarboxylate compound and ethylene glycol, may be present in amount that will be known to the skilled person. In many prior art documents it has been described that an excess of ethylene glycol is to be used. Such excess can be in the range of up to 4-fold and higher. In the present process the molar ratio of 2,5-furandicarboxylate compound to ethylene glycol is in the range of 1:1 to 1:4, suitably 1:1.01 to 1:1.4. Especially when the 2,5-furandicarboxylate compound is 2,5-furandicarboxylic acid, the molar ratio of 2,5-furandicarboxylic acid to ethylene glycol is suitably in the range of 1:1.01 to 1:2, preferably from 1:1.01 to 1:1.5, preferably 1:1.01 to 1:1.15. When the 2,5-furandicarboxylate compound is the dialkyl ester of 2,5-furandicarboxylic acid the molar ratio of the 2,5-furandicarboxylate compound to ethylene glycol is suitably in the range of 1:1.5 to 1:4, preferably from 1:1.6 to 1:3.0.

The ester composition comprises components with 2-hydroxyethyl and 2,5-furandicarboxylate moieties. When a large excess of ethylene glycol is used, the ester composition may suitably comprise bis(2-hydroxyethyl)-2,5,furandicarboxylate as major component. When the excess is lower also compounds such as the mono-ester of ethylene glycol and 2,5-furandicarboxylic acid may be contained in the ester composition or 1,2-bis(2,5-furandicarboxyl)-ethane, i.e. a compound wherein one ethylene glycol molecule has reacted with two 2,5-furandicarboxylic acid molecules. Suitably, when the furandicarboxylate compound is the dialkyl ester of 2,5-furnadicarboxylic acid, an excess of ethylene glycol is used and the ester composition comprises bis(2-hydroxyethyl)-2,5-furandicarboxylate.

In the esterification step the reaction of a 2,5-furandicarboxylate compound and ethylene glycol is known in the art. Hence, the skilled person will realize that although there is no need for using an esterification catalyst when 2,5-furandicarboxylic acid is used as starting material, the use of such a catalyst may be contemplated. As esterification catalysts are advantageously acidic, and since one of the reactants is an acid, the necessity to use an esterification catalyst is lacking. However, when the dialkyl ester of 2,5-furandicarboxylic acid is used as starting material an esterification catalyst that catalyzes the transesterification of the dialkyl ester into bis(2-hydroxyethyl)-2,5-furandicarboxylate is typically used. Hence in such embodiments the 2,5-furandicarboxylate compound and ethylene glycol are suitably reacted in the presence of an esterification catalyst. When such a catalyst is used, it may be a Brønsted or Lewis acid. The Brønsted acids may be strong mineral acids such as sulfuric acid, nitric acid or hydrochloric acid. Suitable Lewis acids include compounds of metals such as the chlorides, bromides, tosylates, alkoxides and triflates of a metal selected from the group consisting of zinc, titanium, tin, calcium and mixtures thereof. It is also possible to use organic esters of the metal acids, such as the alkyl esters of titanic acid, stannic acid and the like. Hence, the esterification catalyst is preferably selected from catalysts containing one or more metals selected from the group consisting of zinc, titanium, tin, calcium and antimony. The use of a titanium-containing or zinc-containing catalyst is especially preferred. The catalysts, if used, may be added from the start of the esterification reaction.

In the esterification reaction volatile compounds are being formed. Such volatile compounds are e.g. the released alcohol if a dialkyl ester of 2,5-furandicarboxylic acid is used as starting material, and water if 2,5-furandicarboxylic acid is used as starting material. It has been found that it is advantageous to remove the volatile compounds formed during the esterification reaction. In this way the esterification reaction being an equilibrium reaction, may be led to completion. The removal of the volatile compounds from the esterification mixture may be conducted in any known manner. It is suitable to pass a vaporous phase containing the volatile compounds through a condenser and remove the condensate that includes the liquefied volatile compounds. The vaporous phase typically comprises also ethylene glycol. Therefore, the vaporous phase is advantageously passed through a distillation system wherein the volatile compounds and ethylene glycol are separated. The ethylene glycol is suitably, at least partly, but preferably substantially completely, recycled to the esterification mixture. The volatile compounds thus separated are discharged. Hence, the process according to the present invention is preferably carried out such that in the esterification step ethylene glycol and any volatile compound that is formed during the reaction between the 2,5-furandicarboxylate compound and ethylene glycol, are removed in a distillation system, and wherein ethylene glycol that is removed with the volatile compounds is separated therefrom and at least partly recycled.

It will be evident that the degree with which the ethylene glycol is entrained in the vaporous phase of the volatile compounds formed is dependent on the temperature and other conditions at which the esterification is carried out.

The conditions that are used in the prior art include a temperature in the range of about 180 to 280° C. and about ambient pressure. In the processes of the prior art these conditions were maintained for a period of about 4 hours. In the method according to the present invention the esterification reaction between the 2,5-furandicarboxylate compound and ethylene glycol is preferably carried out at a temperature of 160 to 240° C. The pressure is suitably in the range of 0.9 to 5 bar, and the reaction is advantageously continued for a period of 0.5 to 5 hr, suitably from 1 to 4 hr. The reaction is conveniently carried out in an inert atmosphere, such as under nitrogen, neon, helium or argon. In certain embodiments, the starting mixture may comprise a diluent, such as water, which is suitably discharged during the reaction.

Applicants have found that diethylene glycol (DEG) is readily formed during the esterification reaction of 2,5-furandicarboxylic acid and ethylene glycol. Compounds such as choline, tetraethyl ammonium hydroxide (TEAOH), tetramethyl ammonium hydroxide (TMAOH), tetrabutyl ammonium hydroxide, salts of carboxylic acids such as calcium or sodium acetate, basic salts of mineral acids, such as $Na_2SO_4$ and $Na_2HPO_4$, alkali metal hydroxides, such as sodium hydroxide, or residual calcium or sodium in the 2,5-furandicarboxylate compound can suppress the formation rate of DEG. Suitable dosages are of 0.01 to 1 mmol/mol 2,5-furandicarboxylate compound, preferably, 0.02 to 0.5 mmol/mol 2,5-furandicarboxylate compound, more preferably 0.04 to 0.30 mmol per mol 2,5-furandicarboxylate compound. Tetraethyl ammonium hydroxide, tetramethyl ammonium hydroxide and $Na_2HPO_4$ have been found to be particularly effective.

When the esterification is being carried out in a batch process then it is possible to monitor the reaction progress by determining the amount of water or alkanol which is produced, and comparing that to the stoichiometrically determined theoretical water or alkanol at 100% esterification. When at least 70% of the theoretical amount of water or alkanol has been removed, the esterification is stopped and the pressure is reduced to start a polycondensation stage. During the pressure reduction unreacted ethylene glycol is removed by vaporization from the reacting mixture. The exact timing for the end of esterification is determined by trials, and is dependent on the subsequent rate of pressure reduction and efficiency of water removal, but typically in batch processes the extent of water or alkanol removal is suitably at least 70% and may be as high as virtually 100%. Preferably, the extent of water or alkanol removal is in the range of 70 to 100%. When 2,5-furandicarboxylic acid is used as starting material the esterification step should preferably not be continued beyond the point of 96%. In case the dialkyl ester of 2,5-furandicarboxylic acid is used as starting material, the (trans)esterification is most preferably continued until at least 95%, most preferably about 100%, of the stoichiometric amount of alkanol has been removed.

When the process is being conducted in a continuous manner then the esterification reaction progress will be controlled through the use of temperature, ethylene glycol feed ratio, and average residence time. The amount of water or alcohol being removed from the system will again give an indication of the extent of the esterification reaction. Also in continuous processes the amount of water or alkanol removed is controlled and the esterification reaction is prolonged until at least 70% of the stoichiometric amount of water or alkanol, based on 100% esterification of 2,5-furandicarboxylate compound feed, has been removed. Reactors, equipment, and controls for the production of poly(ethylene terephthalate) such as described in the book Modern Polyesters: Chemistry and Technology of Polyesters and Copolyesters by J. Scheirs and T. E. Long (eds.), Wiley, 2003, can also be used advantageously for the production of the poly(ethylene 2,5-furandicarboxylate) according to the present invention.

At the end of the esterification step the ester composition is subjected to the polycondensation step. Thereto, the pressure is reduced and, optionally, a polycondensation catalyst is added. By the pressure reduction the excess amount of ethylene glycol is removed. The pressure reduction is suitably such that the pressure in the polycondensation step is at most 700 mbar. The pressure in the polycondensation step may be as low as 0.05 mbar. In a batch process the pressure is reduced compared to the pressure that prevails in the esterification step. In practice, the pressure reduction may take some time. The process of reducing the pressure may take from 0.1 to 1.8 hours. It is advantageous to slowly reduce the pressure in order to prevent the carry-over of the relatively low molecular weight esters into the vacuum system. Therefore, the ester composition passes through a stage wherein the pressure is in the range of 25 to 700 mbar. At this pressure a pre-polycondensation takes place. The eventual polycondensation occurs at a reduced pressure in the region of 0.05 to 20 mbar. Thus the polycondensation step preferably comprises a pre-polycondensation reaction conducted at a pressure of 25 to 700 mbar and a polycondensation reaction conducted at a pressure of 0.05 to 20 mbar. The temperature in the pre-polycondensation reaction is in the range of 180 to 260° C., and polycondensation reaction is conducted at a temperature in the range of 205 to 280° C.

Also in a continuous process, the polycondensation step suitably comprises such a pre-polycondensation reaction and a polycondensation reaction. In case of a continuous process the temperature of the ester composition is suitably raised compared to the starting temperature of the esterification, and the further heated ester composition is subjected to a pressure reduction. By the pressure reduction the composition is depleted of ethylene glycol. After the pressure reduction the product is maintained at the reduced pressure, and optionally, further heated so that a pre-polycondensation stage takes place under evaporation of further ethylene glycol, yielding an oligomer of ethylene furandicarboxylate. This pre-polycondensation may take place in a continuous stirred tank reactor or a horizontal reactor operating with perforated rotating disks. The pressure at this pre-polycondensation reaction may be 25 to 700 mbar. The temperature of the pre-polycondensation is suitably from 180 to 260° C. For further pressure reduction the pre-polycondensation product may be passed to a further reactor where it is led to further polycondensation. For such polycondensation reactions disc-type or cage-type reactors may be used. The pressure in the polycondensation reaction is suitably from 0.05 to 20, suitably from 0.05 to 5 mbar. The duration of the pre-polycondensation is suitably in the range of 0.5 to 2 hours.

The pre-polycondensation step is used to remove excess or unreacted ethylene glycol and to reduce the pressure to remove most of the other volatiles, while avoiding excessive foaming or carryover into vacuum lines. The temperature is raised and the polycondensation reaction begins to occur, with liberation and removal of ethylene glycol which is generated via the pre-polycondensation reaction. In very small batch equipment the same reactor may be used for all stages of the reaction. When the reaction is performed in larger scale batch equipment this step may completed in the same equipment as the esterification reaction, and after this stage the reactant mixture may then be transferred to a vessel especially designed for good mass transfer to promote the polycondensation reaction. Alternatively, the reactant mixture may be moved to a different vessel prior to initiating the pressure let-down and the pre-polycondensation and the polycondensation are then conducted in a single vessel. The addition of polycondensation catalyst may already have occurred at the start of the esterification reaction, so that no further addition of the catalyst to the ester composition is desired at this point.

In a more continuous operation the pre-polycondensation reaction may be conducted in a dedicated vessel, typically with the overhead vapors being collected separately from the vapors generated during the esterification stage. During this process stage the pressure is typically reduced from approximately 1 bar or more used during esterification down to about 25 to 700 mbar, and more preferably to about 20 to 100 mbar.

Other compounds, such as stabilizing agents, may also be added to the ester composition product. The stabilizing agents may include antioxidants. It has been found that the stabilizers also reduces discoloration. Preferable stabilizers include sterically hindered phenolic compounds, phosphites and combinations thereof. Suitable stabilizers are phosphite-containing compounds, phosphate compounds, phosphonate compounds, phosphonite compounds and hindered phenolic compounds. Antioxidants include such compounds as trialkyl phosphites, mixed alkyl/aryl phosphites, alkylated aryl phosphites, sterically hindered aryl phosphites, aliphatic spirocyclic phosphites, sterically hindered phenyl spirocyclics, sterically hindered bisphosphonites, alkyl phosphates, aryl phosphates, mixed alkyl/aryl phosphates, alkylphosphonoacetates, hydroxyphenyl propionates, hydroxy benzyls, alkyl phenols, aromatic amines, hindered amines, hydroquinones and mixtures thereof. Preferred stabilizers comprise a pentaerythritol-phosphite group and alkylphosphonoacetates. Such other compounds may also be added in batch or any other type of operation. Hence compositions containing the polyester prepared according to the invention may comprise such compounds.

Poly(ethylene 2,5-furandicarboxylate) is a slowly crystallizing polyester under quiescent conditions. Nucleating agents may be added to the polyester to increase the nucleation density, and thereby increase the overall crystallization rate under quiescent conditions.

After the pre-polycondensation the ester composition is subjected to a further polycondensation. As is known from the prior art the pressure at this step is further reduced. Pressures of less than about 5 mbar and preferably less than about 3 mbar may be applied. Lower pressures are preferred for good mass transfer and removal of ethylene glycol and water being liberated in the polycondensation and esterification reactions, respectively. Polycondensation temperatures according to the prior art include about 180 to 280° C. The polycondensation according to the invention is preferably carried out at a temperature of 245 to 275° C. and suitably at a pressure of 0.05 to 5 mbar. Under these conditions it is ensured that the ester composition as well as the polycondensate formed is in a molten stage. The polycondensation is suitably continued for a period ranging from 1 to 3 hours. Preferably, the combined period for the pre-polycondensation and the polycondensation steps is in the range of 1 to 5 hours, suitably from 1.5 to 4 hours.

As indicated above, the polycondensation is carried out in the presence of a polycondensation catalyst. Many polycondensation catalysts may be used. Such catalysts include the catalysts comprising one or more elements selected from tin, titanium, zinc, antimony, calcium, manganese, cobalt, hafnium, lead, magnesium, aluminium, cerium, zirconium and mixtures thereof. These compounds may be the acetate or carbonate salts of these metals. Alternatively, metal alkoxides, alkyl metal compounds, or other organometallic compounds are also possible. Other suitable catalysts include the oxides and halides of the elements mentioned. Preferred catalysts include titanium alkoxides, antimony acetate, antimony oxide, and antimony glycolate, i.e. the reaction product of antimony oxide and ethylene glycol. The amounts of the polycondensation catalyst are typically in the range of 0.005 mol % to 0.2 mol %, based on the number of moles of 2,5-furandicarboxylate compound in the starting mixture, preferably in the range of 0.01 to 0.10 mol %.

The polycondensation catalysts may be added to the ester composition when the ester composition has been formed. It is also possible to add the polycondensation catalyst to the starting mixture of 2,5-furandicarboxylate compound and ethylene glycol, optionally in the presence of an esterification catalyst. The esterification catalyst, if present, is suitably present in an amount of 0.005 mol % to 0.2 mol %, based on the number of moles of 2,5-furandicarboxylic acid. When the polycondensation catalyst is added in the starting mixture or at an intermediate point of the esterification process the ester composition formed is suitably not isolated. In a batch process, after forming of the ester composition, the resulting product is preferably kept in the reaction zone where the esterification took place and the product as such is subjected to a pressure reduction in the pre-polycondensation step. In a continuous process, after forming of the ester composition, the resulting product is transported to the next reaction vessel and subjected to a pressure reduction to accomplish evaporation of the ethylene glycol excess to start the pre-polycondensation step.

During the polycondensation step 2,5-furandicarboxylic acid is added to the ester composition. It is preferred that 2,5-furandicarboxylic acid is added to the ester composition not until the ester composition has been exposed to a pressure in the polycondensation step of at most 20 mbar. If desired, the pressure may then be released to facilitate the addition of 2,5-furandicarboxylic acid. It has been found that the addition of 2,5-furandicarboxylic acid before the polycondensation step or during the period wherein the pressure is still above 20 mbar, the advantages of the present invention are not as pronounced as when the addition is done later. When a pre-polycondensation is carried out this means that preferably the addition of 2,5-furandicarboxylicacid is done after the pre-polycondensation. On the other hand, the addition is suitably done not later than about 0.5 hour before the end of the polycondensation step, in order to allow the added 2,5-furandicarboxylic acid to react with the polycondensate that is being formed. Suitably, the 2,5-furandicarboxylic acid is added to the ester composition in the period of 5 to 90 minutes after the reduced pressure in the polycondensation step has been attained.

The amount of 2,5-furandicarboxylic acid that is to be added may vary. Without wishing to be bound by any theory, it is believed that by the addition of 2,5-furandicarboxylic acid the content of acid end groups in the polymer chains of the polycondensate increases.

During the polycondensation polymer chains are formed that have end groups that mainly include carboxylic acid end groups and hydroxyl end groups. When the polymerization is started with a dialkyl ester, e.g. the dimethyl ester of 2,5-furandicarboxylic acid, the end groups may comprise some alkyl end groups. Moreover, due to potential decarboxylation reactions, the end groups in the polycondensate may also comprise some decarboxylated end groups, or furoic acid end groups. If the polyester is to be subjected to a solid state polymerization, it has been found that it is advantageous that the polyester preferably has a relative content of carboxylic acid end groups, expressed as the fraction of the molar amount of carboxylic acid end groups divided by the sum of the molar amounts of hydroxyl end groups and carboxylic acid end groups in the range of 0.10 to 0.7. It has been found that when solid particles of the polyester having such a content of carboxylic acid end groups, are subjected to solid state polymerization the duration of the solid state polymerization can be shortened considerably. An absolute level of carboxylic end groups of 15 to 122 meq/kg may be suitable, preferably from 20 to 100 meq/kg, more preferably from 37 to 90 meq/kg, most preferably from 40 to 75 meq/kg.

In general there are a number of methods to determine the end groups in polyesters. Such methods include titration, infrared and nuclear magnetic resonance (NMR) methods. Often the separate methods are used to quantify the four main end groups: carboxylic acid end groups, hydroxyl end groups, alkyl ester groups, such as the methyl ester end groups (for polyesters from the dialkyl ester of a dicarboxylic acid) and the end groups that are obtained after decarboxylation. A. T Jackson and D. F. Robertson have published an $^1$H-NMR method for end group determination in "Molecular Characterization and Analysis of Polymers" (J. M. Chalmers en R. J. Meier (eds.), Vol. 53 of "Comprehensive Analytical Chemistry", by B. Barcelo (ed.), (2008) Elsevier, on pages 171-203. In this method the hydroxyl end group is determined in polyethylene terephthalate (PET) by using a selection of harsh solvents such as 3-chlorophenol, 1,1,1,3,3,3-hexafluoro-2-propanol, trichloroacetic acid or trifluoroacetic acid. It is preferred to use deuterated 1,1,2,2-tetrachloroethane (TCE-d2) as solvent without any derivatization of the polyester. A similar method can be carried out for polyesters that comprises furandicarboxylate moieties and ethylene glycol residues. The measurement of the end groups for the latter polyesters can be performed at room temperature without an undue risk of precipitation of the polyester from the solution. This $^1$H-NMR method using TCE-d2 is very suitable to determine the hydroxyl end groups (HEG), the decarboxylation and the content of diethylene glycol (DEG) groups. Peak assignments are set using the TCE peak at a chemical shift of 6.04 ppm. The furan peak at a chemical shift of 7.28 ppm is integrated and the integral is set at 2.000 for the two protons on the furan ring. The HEG is determined from the two methylene protons of the hydroxyl end group at 4.0 ppm. The content of DEG is determined from the integral of the shifts at 3.82 to 3.92 ppm, representing four protons. The decarboxylated end groups are found at a shift of 7.64-7.67 ppm, representing one proton. When the polyester also comprises methyl ester end groups, the methyl signal will occur at 3.97 ppm, representing 3 protons.

The carboxylic acid end groups are determined by using the titration method according to ASTM D7409, adapted for poly(ethylene 2,5-furandicarboxylate). A thus modified method thereof involves the titration of a 4%w/w solution of poly(ethylene 2,5-furandicarboxylate) in ortho-cresol with 0.01M KOH in ethanol as titrant to its equivalence point, using 0.5 mg of bromocresol green (2,6-dibromo-4-[7-(3,5-dibromo-4-hydroxy-2-methyl-phenyl)-9,9-dioxo-8-oxa-9λ6-thiabicyclo[4.3.0]nona-1,3,5-trien-7-yl]-3-methyl-phenol) in 0.1 ml ethanol as indicator.

For the purpose of the present application the values for HEG and the decarboxylated end groups are obtained by $^1$H-NMR using TCE-d2, whereas the values for CEG are determined by the titration method described above.

The amount of 2,5-furandicarboxylic acid that is added to the ester composition may be varied in accordance with the desired amount of carboxylic end groups. When the polymerization starts from a dialkyl ester of 2,5-furandicarboxylic acid or when the molar ratio of ethylene glycol to 2,5-furandicarboxylate compound is relatively high, the number of carboxylic acid end groups is relatively small. Therefore, the addition of 2,5-furandicarboxylic acid is especially useful in these cases. It has been found that it is preferred that the amount of 2,5-furandicarboxylic acid that is added to the ester composition is in the range of 0.1 to 10 mole %, based on the molar amount of the 2,5-furandicarboxylate compound that is provided in the esterification step.

The molecular weight of the polycondensate prepared according to the present invention may be expressed as an intrinsic viscosity. To determine the intrinsic viscosity, first the relative viscosity ($\eta_{rel}$) determined in a 60/40 w/w mixture of phenol and tetrachloroethane is at 30° C. and a concentration (c) of 0.4 g/dL. This procedure is similar to the ASTM D4603 standard for the determination of the inherent viscosity for poly(ethylene terephthalate). The intrinsic viscosity is then calculated using the Billmyer equation:

$$\text{Intrinsic viscosity (IV)} = \{\eta_{rel} - 1 + 3*\ln(\eta_{rel})\}/(4*c)$$

The intrinsic viscosity is suitably greater than 0.45 dL/g and more preferably in the range of 0.45 to 1.0 dL/g. The intrinsic viscosity is a feature closely linked to the weight average molecular weight, Mw. The weight average molecular weight and the number average molecular weight (Mn) can also be determined through the use of gel permeation chromatography (GPC). GPC measurements are suitably performed at 25° C. For the calculation polystyrene standards are used. As eluent suitably a solvent mixture of chloroform:2-chlorophenol 6:4 (vol/vol) can be used. In the experimental part GPC measurements were carried out under these conditions on a Merck-Hitachi LaChrom HPLC system equipped with two PLgel 5 μm MIXED-C (300×7.5 mm) columns. Calculation of the molecular weight was carried out by Cirrus™ PL DataStream software. When the weight average molecular weight Mw and number average molecular weight Mn are determined for the polyester prepared according to present invention, the polydispersity index (Mw/Mn) is suitably in the range of 1.9 to 2.6.

When the polycondensate is recovered as solid material from the polycondensation step, the polycondensate is rather amorphous. However, for further processing the polyester is preferably semi crystalline. The crystallinity of a polymer tends to affect its physical properties, such as its density and melting temperature. Polymer crystallinity can be determined with Differential Scanning Calorimetry (DSC) by quantifying the heat associated with melting of the polymer. The crystallinity is often expressed as net enthalpy of melting in terms of number of Joules per gram which number is derived from the DSC technique. The polyester prepared according to the present invention preferably has a crystallinity of at least 25 J/g, measured by DSC. A maximum enthalpy in terms of number of Joules per gram of a highly crystallized poly(ethylene 2,5-furandicarboxylate) through isothermal process is typically 90 J/g. The polyester according to the present invention having a certain degree of crystallinity then also has a melting point. The melting point of a polymer is easily determined by DSC and measured at the top of the endothermic peak. The ISO11357-3 standard describes such a melting determination. In accordance with this determination, the polyester according to the present invention suitably has a melting point of at least 215° C. In highly crystalline polyester the melting point may exceed 230° C., and even be as high as 245° C.

In order to render the polycondensate into a more crystalline material, the polycondensate is preferably crystallized at a temperature in the range of 90 to 200° C. Thereto, the polycondensate is preferably crystallized at a temperature in the range of 90 to 200° C. for a period of 2 to 48 hr in a crystallization step to yield a semi-crystalline polyester. In certain arrangements the heating step may entail controlling the temperature of the pellet during pelletization such that the final pellet temperature is in a range where crystallization occurs. Prior to any step of additional heating any adhered water from the pelletizing step is removed. This procedure is suitably carried out by bringing the temperature of the polycondensate to the desired temperature in the range of 90 to 200° C. For poly(ethylene 2,5-furandicarboxylate) it has been found that the most rapid crystallization occurs at approximately 160-170° C. It has also been found that if the particles are held for approximately 1 hour at 90 to 120° C. the subsequent crystallization at 160-170° C. is faster. The heating step can suitably be conducted at atmospheric pressure or under vacuum. The heat can suitably be provided by a water bath. The optimal temperature program will depend on the particular arrangements used for the crystallization. Typically, the polycondensate is kept a temperature in the range of 90 to 140° C. for a period of 0.2 to 2.5 hrs, followed by a crystallization step for 1 to 48 hours at a temperature in the range of 120 to 200° C. It has been found that the polyester chains in the polycondensate crystallize under these conditions yielding a semi-crystalline polyester. The polyester thus obtained suitably has a crystallinity of at least 25 J/g, measured by DSC. It suitably has a melting point of at least 215° C.

For crystallization of the polyester prepared according to the present invention crystallization may be conducted from the melt (as may be done in an underwater pelletizer with in-situ crystallization) or from the glassy state (after cooling of polymer granulates). To this end it may be desirable to add a nucleating agent to the polyester after the polycondensation, typically still in the melt phase. Typical addition levels will be from 0.05 to 2 wt %, or more preferably 0.1 to 1 wt %, based on the total polyester. The inorganic minerals may be added at higher levels, such as up to 5 or even 10 wt % if desired.

Nucleating agents may include inorganic minerals, organic salts, high melting waxes, or other polymers. Examples of inorganic minerals include talc, titanium dioxide, fused silica, boron nitride, mica, and calcium carbonate. Some examples of the organic salts sodium stearate, zinc stearate, other stearate salts, salts of other fatty acids, FDCA disodium salt, sodium salt of saccharine, salts of benzoic acid, aromatic phosphonates, sulfonic acid ester salts of isophthalic acid, and commercial materials such as bis(4-propylbenzylidene) propyl sorbitol, available as Millad®NX88 from Milliken Chemicals and 3,4-Dimethylbenzylidene sorbitol, available as Millad®3988, phosphate salts and esters, available as NA-11, methylen-bis(4,6-di-t-butylphenyl)phosphate sodium salt, or NA-21, aluminium-hydroxy-bis[2,2"-methylene-bis(4,6-di-t-butyl-phenyl)-phosphate. High melting waxes include materials such as stearamides and erucamides, or bis-amides. Polymers can include materials such as ionomers e.g. Surlyn ionomers from Du Pont, or Aculyn ionomers from Rohm and Haas, PEG2000 (polyethylene glycol), PET, PBT or others. Nucleating agents may also be used in the crystallization of polymers in different situations. Polymer crystallization can be conducted for a number of reasons, each of which would then be performed under different conditions. For example, to create a semi-crystalline part in an injection molding machine it would be required to have a rapid crystallization of the polymer during cooling from the melt. On the other hand, for crystallization of material prior to drying of reclaimed scrap, it would be desired to have the polymer crystallize rapidly from the glassy state, or on the up-heat.

The polycondensate prepared after the polycondensation step may be subjected to a subsequent solid stating step. Such a step suitably takes place at a temperature in the range of 180° C. to 220° C., but in all cases below the melting point of the polycondensate. The pressure may be elevated, but is suitably ambient with an inert gas flow or may be below atmospheric pressure, such as below 100 mbar. The solid stating step may be carried out for a period up to 120 hr, suitably in the range of 2 to 60 hr, to obtain a solid state polymerized polyester. The solid state polymerized polyester has a desirably high molecular weight.

It has been found that especially polyesters that have a certain hydroxyl end group content show the higher solid state polymerization rates and/or show the best performance as coloration improvement. Such polyesters are provided by the present invention. Therefore, the present invention also provides a polyester comprising ethylene 2,5-furandicarboxylate units, which polyester has a number average molecular weight (Mn) as determined by gel permeation chromatography (GPC) using polystyrene as standard, of at least 10,000, and which polyester has a hydroxyl end group content in the range of 65 to 120, preferably from 70 to 115 meq/kg. The Mn is preferably from 10,000 to 25,000. The carboxyl acid end group content of such advantageous polyesters ranges suitably from 35 to 70.

The invention will be further illustrated by means of the following example

EXAMPLES

In the following Examples molecular weight measurements were preformed on a Merck-Hitachi HPLC system equipped with two PLgel 5 μm MIXED-C (300×7.5 mm) columns. Chloroform/2-chlorophenol 6:4 vol/vol solvent mixture was used as eluent. Molecular weight determination was based on polystyrene standards and carried out by Cirrus™ PL DataStream software.

Color measurements were carried out in 30 mg/mL polymer solutions using dichloromethane:hexafluoroisopropanol 8:2 vol/vol solvent mixture. Absorbances at wavelength of 400 nm were recorded on a Heliosa (ThermoSpectronic) spectrophotometer, and expressed as the fraction of light absorbed.

Carboxylic acid end group contents (CEG) were determined by titration and expressed in meq/kg. Hydroxyl end group contents (HEG) were determined by $^1$H-NMR in deuterated 1,1,2,2-tetrachloro ethane and expressed in meq/kg.

Example 1

Four polycondensates were prepared in Experiment Nos. 1 to 4. The only difference between the preparations in Experiment Nos. 2 to 4 was the timing of the addition of 2,5-furandicarboxylic acid (FDCA). In Experiment No. 1 no FDCA was added at all. In that respect it is similar to the comparative experiment in WO2014/204296. The preparations were conducted as follows.

Into a 100 mL three-necked flask equipped with nitrogen inlet, mechanical stirrer and condenser, 13.8 g (75 mmol) dimethyl-2,5-furandicarboxylate (DMF), 11.1 g (179 mmol) ethylene glycol (EG), 180 μL Zn(II) acetate (120 ppm Zn) solution (127.5 mg in 5 mL EG), and 315 μL Sb (267 ppm Sb) solution (2.086 g $Sb_2O_3$ in 150 mL EG) were added. The flask was then immersed into a 215° C. oil bath. Methanol started to distil out within one minute. Transesterification was continued for 4 hours. Then triethylphosphonoacetate (an equimolar amount as zinc) was added as a solution of triethylphosphonoacetate in EG.

After 5 minutes stirring, vacuum was slowly applied and the temperature was raised to 240° C. (oil bath). The stirrer speed was set to 150 rpm.

In a period of about 10 min a vacuum of about 1 mbar was reached.

After different periods of polycondensation the vacuum was released and 106.5 mg (0.68 mmol=0.91 mol % based on DMF) FDCA was added to the reaction mixture. Then the vacuum was again applied at a pressure of <1 mbar. The polycondensation step of the pre-polycondensation and the polycondensation was finished after a total 2.5 hours.

In Experiment No. 5 the same procedure was followed as the one for Experiment No. 3, the only difference being that instead of 106.5 mg FDCA 213 mg FDCA was added.

The properties of the resulting polycondensates, and the timing of the FDCA addition are shown in Table 1. The Table shows the Experiment number (Exp. No.), the time after the start of the polycondensation step when FDCA was added (t, expressed minutes), the number average molecular weight at the time of FDCA addition, determined by Gel Permeation Chromatography (GPC) using polystyrene as standard ($Mn_{add}$), the number average molecular weight of the polycondensate ($Mn_{polyc}$), the weight average molecular weight ($Mw_{polyc}$), the absorbance of the polycondensate (A), the carboxylic acid end group content (CEG), and the hydroxyl end group content (HEG).

TABLE 1

| Exp. No. | t, min | $Mn_{add}$ | $Mn_{polyc}$ | $Mw_{polyc}$ | A | CEG, meq/kg | HEG, meq/kg |
|---|---|---|---|---|---|---|---|
| 1 | — | — | 18,500 | 43,600 | 0.007 | 10.3 | — |
| 2 | 30 | 4,940 | 15,400 | 38,100 | 0.006 | 20.0 | 129.6 |
| 3 | 60 | 7,930 | 16,400 | 40,100 | 0.008 | 41.3 | 98.3 |
| 4 | 90 | 13,400 | 14,300 | 34,000 | 0.007 | 71.0 | 97.2 |
| 5 | 60 | 8,500 | 13,800 | 32,800 | 0.013 | 62.3 | 111.0 |

The polycondensates were subjected to solid state polymerization using the following procedure. The polycondensates were ground and sieved to obtain a fraction with particles having particle sizes in the range of 0.6 to 1.4 mm. The particles were crystallized by maintaining them overnight at 110° C. and subsequently at 165° C. for 2 hours. After crystallization, 100 mg polymer was measured into a small glass tube (17 cm high, 8 mm inner diameter) closed by glass frit (P1) on one end. The polymer sample was then subjected to solid state polymerization at a temperature of 200° C. and at a nitrogen flow of 4.0 mL/min.

The results of the solid state polymerizations are shown in Table 2. Table 2 indicates the polycondensate (PEF) from which experiment was used, the time of the solid state polymerization, and the Mn at that time.

TABLE 2

| Exp. No | PEF from Exp. No. | t, hr | Mn | Mw |
|---|---|---|---|---|
| 6 | 1 | 0 | 18,500 | 43,600 |
|   |   | 7 | 30,000 | 69,800 |
|   |   | 24 | 37,000 | 92,000 |
| 7 | 2 | 0 | 15,400 | 38,100 |
|   |   | 6 | 30,000 | 65,200 |
|   |   | 22 | 35,200 | 82,300 |
|   |   | 29 | 39,400 | 93,000 |
| 8 | 3 | 0 | 16,400 | 40,100 |
|   |   | 6 | 32,500 | 67,800 |
|   |   | 7 | 36,000 | 80,200 |
|   |   | 22 | 40,200 | 92,000 |
|   |   | 24 | 44,400 | 109,300 |
| 9 | 5 | 0 | 13,800 | 32,800 |
|   |   | 6 | 29,600 | 60,200 |
|   |   | 22 | 36,100 | 83,600 |
|   |   | 29 | 39,700 | 91,100 |

The results show that the rate with which the molecular weight increases is higher for the polycondensates in Experiment Nos. 7-9 than for the polycondensate to which no FDCA has been added, viz. the polycondensate in Experiment No. 6.

Example 2

To show that other catalysts result in different polyesters, but that also in the preparation of these polyesters the invention provides excellent advantages, the following experiments were carried out.

Similarly to the procedure in Example 1, 13.8 g (75 mmol) dimethyl-2,5-furandicarboxylate (DMF), 9.3 g (150 mmol) ethylene glycol (EG), and 104 ppmw Ti as titanium (IV)butoxide solution in toluene were introduced into a 100 mL three-necked flask equipped with nitrogen inlet, mechanical stirrer and condenser. The flask was then immersed into a 215° C. oil bath. Methanol started to distil out within one minute. Transesterification was continued for 4 hours.

Vacuum was slowly applied and the temperature was set at 215 or 245° C. (oil bath).

After different periods of polycondensation 585 mg (3.75 mmol=5.0 mol % based on DMF) or 351 mg (2.25=3 mol %) FDCA were added to the reaction mixture. Then the vacuum was again applied at a pressure of <1 mbar. The polycondensation step was finished after a total 3 hours.

The properties of the resulting polycondensates, the timing of the FDCA addition are shown in Table 3. The Table shows the Experiment number (Exp. No.), the time after the start of the polycondensation step when FDCA was added (t, expressed minutes), the amount of FDCA added, the polycondensation temperature (T), the number average molecular weight of the polycondensate (Mn), the absorbance of the polycondensate (A), the carboxylic acid end group content (CEG), and the hydroxyl end group content (HEG).

TABLE 3

| Exp. No. | t, min | FDCA, mg | T, ° C. | Mn | A | CEG, meq/kg | HEG, meq/kg |
|---|---|---|---|---|---|---|---|
| 10 | — | — | 245 | 16,900 | 0.056 | 9.6 | 137.9 |
| 11 | 0* | 585 | 245 | — | 0.036 | 8.7 | 163.2 |
| 12 | 15 | 585 | 215 | — | 0.018 | 15.4 | 139.0 |
| 13 | 15 | 585 | 245 | 17,500 | 0.013 | 54.8 | 83.5 |
| 14 | 15 | 351 | 245 | 15,200 | 0.017 | 17.8 | 155.5 |

*FDCA was added about 10 minutes before the pressure reduction was applied.

The results of Experiment Nos. 10 and 11 show that when no FDCA is added the discoloration is highest, and that when FDCA is added before the polycondensation step, the CEG content is not increased, which shows that the solid state polymerization rate will not be increased either. The absorbance behaviors of the polycondensates prepared according to the invention, i.e. those of Experiment Nos. 12-14, are excellent.

Some of the polycondensates were subjected to solid state polymerization using the same procedure as in Example 1.

The results of the solid state polymerizations are shown in Table 4. Table 4 indicates the polycondensate from which experiment was used, the time of the solid state polymerization, and the Mn at that time.

TABLE 4

| Exp. No | PEF from Exp. No. | t, hr | Mn |
|---|---|---|---|
| 15 | 10 | 0 | 16,900 |
|  |  | 6 | 25,900 |
| 16 | 13 | 0 | 17,500 |
|  |  | 6 | 27,800 |
| 17 | 14 | 0 | 15,200 |
|  |  | 6 | 28,600 |

The results show that also the solid state polymerization rates show improvement for the polycondensates prepared according to the invention.

The invention claimed is:

1. A process for the preparation of a polyester comprising ethylene 2,5-furandicarboxylate units, wherein in an esterification step a 2,5-furandicarboxylate compound is reacted with ethylene glycol to form an ester composition, comprising components with 2-hydroxyethyl and 2,5-furandicarboxylate moieties; wherein in a polycondensation step the ester composition thus obtained is subjected to polycondensation at reduced pressure in the presence of a polycondensation catalyst to obtain a polycondensate; and wherein during the polycondensation step 2,5-furandicarboxylic acid is added to the ester composition.

2. The process according to claim 1, wherein the 2,5furandicarboxylate compound is selected from the group consisting of 2,5-furandicarboxylic acid, dialkyl ester of 2,5-furandicarboxylic acid and combinations thereof.

3. The process according to claim 2, wherein the 2,5furandicarboxylate compound is dimethyl-2,5-furandicarboxylate, diethyl-2,5-furandicarboxylate or a mixture thereof.

4. The process according to claim 1, wherein the molar ratio of 2,5-furandicarboxylate compound to ethylene glycol is in the range of 1:1.01 to 1:4.

5. The process according to claim 1, wherein the esterification step is carried out in the presence of an esterification catalyst, preferably a zinc-containing or titanium-containing catalyst.

6. The process according to claim 1, wherein the esterification step is carried out at a temperature of 160 to 240° C. and a pressure of 0.9 to 5 bar for a period of 0.5 to 5 hr.

7. The process according to claim 1, wherein in the esterification step ethylene glycol and any volatile compound that is formed during the reaction between the 2,5-furandicarboxylate compound and ethylene glycol, are removed in a distillation system, and wherein ethylene glycol that is removed with the volatile compounds is separated therefrom and at least partly recycled.

8. The process according to claim 1, wherein the polycondensation step comprises a pre-polycondensation reaction conducted at a pressure of 25 to 700 mbar and a polycondensation reaction conducted at a pressure of 0.05 to 20 mbar.

9. The process according to claim 1, wherein the polycondensation step takes a period in the range of 1.5 to 4 hours.

10. The process according to claim 1, wherein during the polycondensation step ethylene glycol that is formed is removed from the ester composition that is subjected to polycondensation.

11. The process according to claim 1, wherein the polycondensation step is carried out in the presence of a polycondensation catalyst selected from the catalysts comprising one or more elements selected from tin, zinc, titanium, antimony and combinations thereof.

12. Process according to claim 1, wherein the polycondensation reaction is carried out at a temperature of 205 to 280° C. and a pressure of 0.05 to 20 mbar.

13. The process according to claim 1, wherein 2,5furandicarboxylic acid is added to the ester composition when the ester composition has been exposed to a pressure in the polycondensation step of at most 20 mbar.

14. The process according to claim 1, wherein 2,5furandicarboxylic acid is added to the ester composition in the period of 5 to 90 minutes after the reduced pressure in the polycondensation step has been attained.

15. The process according to claim 1, wherein the amount of 2,5furandicarboxylic acid that is added to the ester composition is in the range of 0.1 to 10 mole %, based on the molar amount of the 2,5-furandicarboxylate compound that is provided in the esterification step.

16. The process according to claim 1, wherein the polycondensate is crystallized at a temperature in the range of 90 to 200° C. for a period of 2 to 48 hr in a crystallization step to yield a semi-crystalline polyester.

17. The process according to claim 16, wherein the semicrystalline polyester is subjected to solid state polymerization at a temperature in the range of 180 to 220° C. for a period of at most 120 hr to obtain a solid state polymerized polyester.

18. A polyester comprising ethylene 2,5-furandicarboxylate units, which polyester has a number average molecular weight as determined by gel permeation chromatography (GPC) using polystyrene as standard, of at least 10,000, and which polyester has a hydroxyl end group content in the range of 65 to 120, determined by 1H-NMR in deuterated 1,1,2,2-tetrachloro ethane.

19. The polyester according to claim 18, further comprising one or more metals selected from the group consisting of zinc, titanium, tin and calcium.

* * * * *